(12) United States Patent
Pandey (10) Patent No.: US 11,403,161 B2
(45) Date of Patent: Aug. 2, 2022

(54) METHOD AND APPARATUS FOR IDENTIFYING ERRORS IN A DATA STORE

(71) Applicant: Walmart Apollo, LLC, Bentonville, AR (US)

(72) Inventor: Divakant Pandey, Up (IN)

(73) Assignee: Walmart Apollo, LLC, Bentonville, AR (US)

( * ) Notice: Subject to any disclaimer, the term of this patent is extended or adjusted under 35 U.S.C. 154(b) by 20 days.

(21) Appl. No.: 16/870,555

(22) Filed: May 8, 2020

(65) Prior Publication Data

US 2020/0356432 A1    Nov. 12, 2020

Related U.S. Application Data

(60) Provisional application No. 62/893,309, filed on Aug. 29, 2018.

(30) Foreign Application Priority Data

May 10, 2019    (IN) .............................. 201911018721

(51) Int. Cl.
| | | |
|---|---|---|
| *G06F 11/00* | (2006.01) | |
| *G06F 11/07* | (2006.01) | |
| *G06N 5/04* | (2006.01) | |
| *G06F 16/28* | (2019.01) | |
| *G06N 20/00* | (2019.01) | |

(52) U.S. Cl.
CPC ...... *G06F 11/0772* (2013.01); *G06F 11/0727* (2013.01); *G06F 11/0751* (2013.01); *G06F 16/284* (2019.01); *G06N 5/04* (2013.01); *G06N 20/00* (2019.01)

(58) Field of Classification Search
CPC ............. G06F 11/0772; G06F 11/0727; G06F 11/0751; G06F 11/0793; G06F 16/284; G06F 16/215
See application file for complete search history.

(56) References Cited

U.S. PATENT DOCUMENTS

| | | |
|---|---|---|
| 7,370,057 B2 | 5/2008 | Burdick |
| 7,792,770 B1 | 9/2010 | Phoha |
| 8,001,527 B1 | 8/2011 | Waheed |
| 8,380,642 B2 | 2/2013 | Stundner |
| 8,788,407 B1 | 7/2014 | Singh |
| 9,201,914 B2 | 12/2015 | Bou-Diab |
| 2015/0006468 A1* | 1/2015 | Duan ................. G06F 16/245 707/602 |
| 2015/0234954 A1 | 8/2015 | Samuel |
| 2015/0324437 A1* | 11/2015 | Jiang ................. G06F 40/18 707/602 |
| 2016/0092290 A1* | 3/2016 | Gerstl ................. G06F 11/079 714/37 |
| 2017/0132525 A1* | 5/2017 | Rozier ................. G06Q 10/10 |
| 2017/0236060 A1 | 8/2017 | Ignatyev |

* cited by examiner

*Primary Examiner* — Philip Guyton
(74) *Attorney, Agent, or Firm* — Fitch, Even, Tabin & Flannery LLP (57) ABSTRACT

A data processing framework suitable for use with data stores is described. The data processing framework identifies which data stores are storing corrupt or invalid data that may cause end user software applications to malfunction or crash altogether. Data parsing, validation and transformation may be performed as parts of a single operation to increase speed and reduce computing overhead.

18 Claims, 6 Drawing Sheets

METHOD AND APPARATUS FOR IDENTIFYING ERRORS IN A DATA STORE

RELATED APPLICATION

This Application claims priority to Indian Patent Application No. 201911018721, filed May 10, 2019 and entitled "Method and Apparatus for Identifying Errors in a Data Store", and to Provisional Application 62/893,309, filed Aug. 29, 2019, and entitled "Method and Apparatus for Identifying Errors in a Data Store" the contents of both of which are incorporated herein by reference in their entirety.

BACKGROUND

Data stores hold large volumes of data. The data in the data store is frequently provided as input to applications. In order to be processed by the applications, the data must comply with a number of requirements such as, but not limited to, being stored in a correct format and meeting specified validity requirements. The data in the data store may also need to be susceptible of transformation to a desired input format for the application. Conventional enterprise data cleaning techniques have attempted to ensure compliance with these and other requirements by performing a number of sequential operations.

BRIEF SUMMARY

In one exemplary embodiment, a system for performing rule-based data configuration includes at least one data store configured to hold data. The system further includes a computing device equipped with a processor that is configured to execute a data processing platform including a global shared library. The global shared library includes a set of data configuration rules. The data configuration rules include rules for parsing, validating and processing data. The system further includes a data parsing layer. The data parsing layer is configured to receive the data from the at least one data store and parse the data into a data validation schema based at least in part on one or more rules in the global shared library. The system further includes a data validation layer. The data validation layer is configured to identify one or more invalid data columns in the data validation schema based at least in part on at least one data validation rule in the global shared library, identify one or more empty columns in the data validation schema based at least in part on the at least one validation rule, and identify one or more valid columns in the data validation schema based at least in part on the at least one validation rule. The system further includes a data processing layer. The data processing layer is configured to convert the one or more valid columns into a data format associated with an ingestion system based at least in part on one data processing rule in the global shared library, identify a location of an error in the at least one data store based at least in part on the empty columns and the invalid columns, and output the one or more valid converted columns to the ingestion system.

In another embodiment an exemplary method for identifying an error in a data store is disclosed, including inputting data from at least one data store, parsing the data into a data validation schema retrieved from a shared library, and removing one or more empty columns from the data validation schema. The method further includes identifying one or more invalid columns in the data validation schema based at least in part on at least one data validation rule, identifying one or more valid columns in the data validation schema based at least in part on the at least one data validation rule, and converting the one or more valid columns into a data format associated with an ingestion system. The method additionally includes identifying a location of an error in the at least one data store based at least in part on the empty columns and invalid columns and outputting the one or more converted valid columns to the ingestion system.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

The data processing framework provided by the embodiments disclosed herein improves and expedites the time spent pre-processing large volumes of data, imported from geographically dispersed data stores or data warehouses that are used by end user software applications. Data stores store a tremendous amount of data some of which can be corrupted by malfunctioning hardware, firmware, or software running on the hardware in the data stores. Oftentimes this corrupted data may not be identified until all of the data needed by the end user application has been imported, parsed, and analyzed for any errors. The data processing framework described herein identifies which data stores are storing corrupt or invalid data that may cause end user software applications to malfunction or crash altogether.

Conventionally, data is first imported from data stores and then parsed into a format, based on a schema, used to analyze the data for any errors. All of the data is parsed, and after all of the data has been parsed; the data is analyzed for any errors. Importing all of the data, parsing all of the data, and then analyzing all of the data can result in substantial processing overhead. In contrast, embodiments disclosed herein perform operations in parallel to parse the data as it is being imported and analyze the data as it is being parsed thereby reducing the amount of time, clock cycles, and processing power required to identify errors and a trend of errors.

Figure 1:
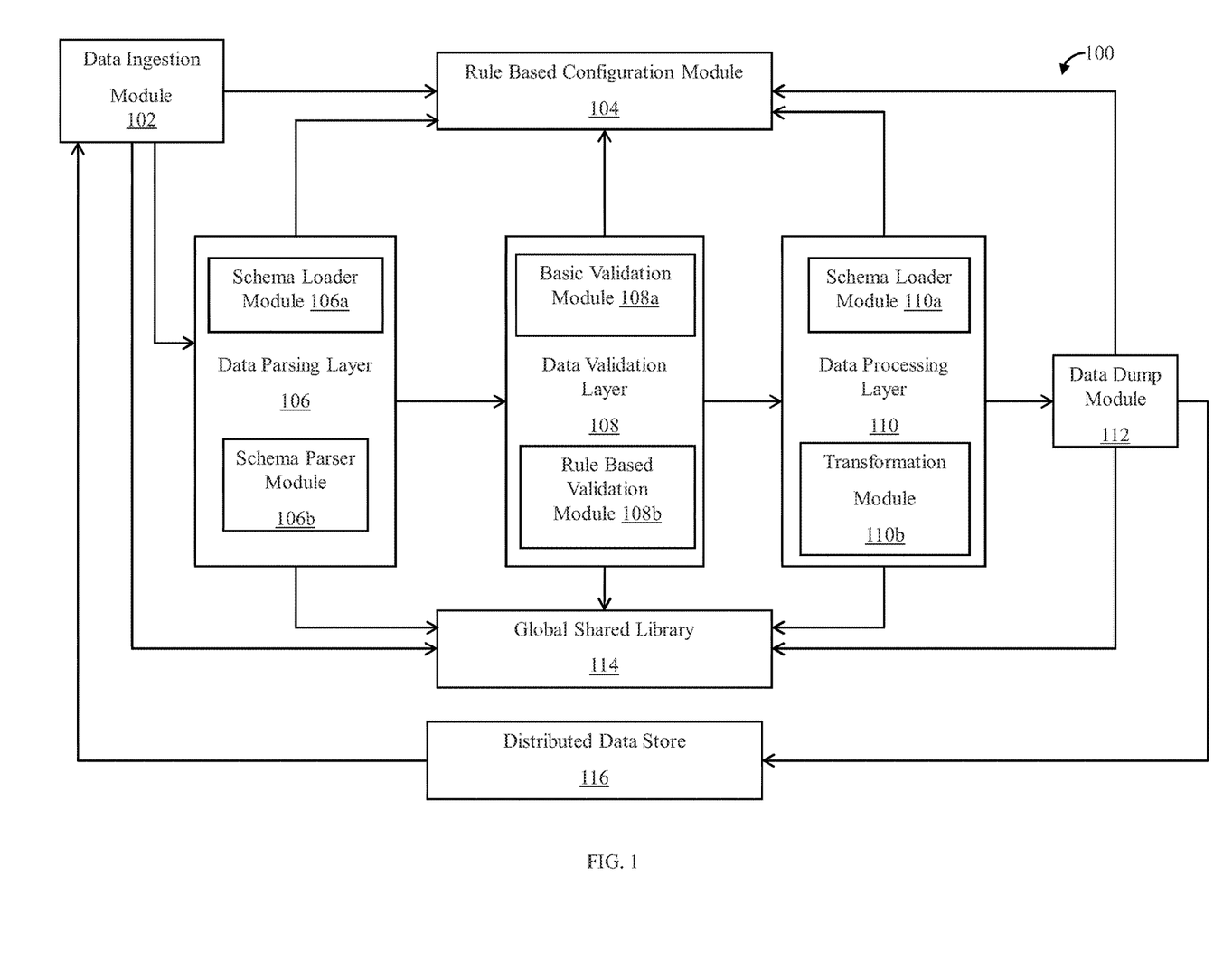
FIG. 1 is a block diagram of a data processing framework, according to an exemplary embodiment.

FIG. 1 is a block diagram of a data processing framework, according to an exemplary embodiment. Data processing framework 100 depicts relationships between different instruction sets, stored in a computer readable media, that cause one or more processors to import data from a distributed data store, parse the data while it is being imported into a format that the one or more processors can use to validate the imported data, and identify errors in the data while it is being parsed based on invalid or empty fields in the parsed data. The valid parsed data is transformed into a format that is compatible with one or more data stores in the distributed data store.

Data ingestion module 102 for the framework may include one or more pieces of hardware (e.g., ports connecting the one or processors to the distributed data store via a network interface) and software executing on the one or processors that cause the one or more processors to import data from one or more storage devices in the distributed data store 116. The distributed data store 116 can include a relational database management system (RDBMS), one or more distributed storage devices, a data warehouse, and/or a big data ecosystem. The data may be stored in one or more computer readable media in the one or more storage devices, and the one or more processors may send commands to the distributed data store 116 via data ingestion module 102 to retrieve the data from the distributed data store 116. After the one or more processors receives the data the one or more processors may parse the data in accordance with the data parsing layer 106, validate the parsed data in accordance with the data validation layer 108, and process the data in accordance with the data processing layer 110 in a single operation.

Data can be ingested by data processing framework 100 in real time or in batches. When data is imported in batches, data is imported in discrete chunks in periodic intervals of time. Data ingestion module 102 may prioritize the order in which data is received from the one or more storage devices in the distributed data store.

The data parsing layer 106 may be an instruction set for performing parsing of the data imported via data ingestion module 102 including schema loader module 106a and schema parser module 106b. The data parsing layer 106 may receive the data and parse the data in accordance with a particular schema. In some embodiments, the schema may be a key-value pair schema, where the imported data is parsed into a table [Coalton: please save plurality and comprising for the claim section] including columns corresponding to the keys and rows corresponding to the values (records). For example, the imported data may include data fields and corresponding data values separated by a delimiter, and the data parsing layer 106 may identify each of the one or more data fields and the corresponding values, map each of the data fields to a corresponding key, and map each of the values corresponding to each of the data fields to a corresponding value for each of the keys. For instance the imported data may include one or more comma separated value (CSV) files, and the data parsing layer 106 may identify each of the data fields separated by a comma delimiter. The data parsing layer 106 can generate a corresponding value in a table associated with each of the data fields. There may be multiple values for each of the data fields. The data parsing layer 106 maps each of the multiple values to a value corresponding to a key. Each of the keys corresponds to a column and each of the values corresponding to the key may correspond to a record. Each of the rows corresponds to a record, and each record includes multiple values, each of which corresponds to a key.

The instruction set for the data parsing layer 106 may include instructions for loading the schema (i.e., the schema loader module 106a). The schema may be based at least in part on data corresponding to one or more dynamic link libraries. The dynamic link libraries may be part of the global shared library 114. As mentioned above the schema may be based on a delimiter which may also be referred to as a structured file format. In some embodiments, the schema may be based on an unstructured file format such as a table whose contents are accessed using a key value pair.

In one embodiment, data parsing layer 106 includes an instruction set, referred to as the schema parser module 106b, that when executed parses the data according to the schema. Schema parser module 106b may parse a structured file into an unstructured file format such as a key value pair table schema.

In one embodiment, data validation layer 108 is an instruction set for validating the parsed data and includes basic validation module 108a and rule-based validation module 108b. Data validation layer 108 validates that the data type of the parsed data corresponds to a data type to be exported to the distributed data store 116. For example, a column in a key value pair table corresponds to a key and each row corresponding to that column corresponds to a value for the key. Each of the values in the column should correspond to a data type associated with a data type associated with the key. The data validation layer 108 may check the data type of each of the values in the column against the data type associated with the key. For example, if the data type associated with the key is a floating point number and the data type of multiple values in the column correspond to an integer value, data validation layer 108 can execute rule-based configuration module 104 to identify the column as an invalid column. As a result of executing these instructions in the rule-based configuration module 104, data validation layer 108 can cluster the columns across all files that include the key into a memory pool for analysis in accordance with a machine learning instruction set. As explained below the analysis performed by executing the machine learning instruction set determines defects or errors in the hardware, firmware, and/or software in the distributed data store. For example, there can one or more hardware devices included in the distributed data store that may have an outdated version of firmware executing on one or more components of the hardware devices, thereby causing the hardware devices to generate incorrect values for the column corresponding to the key. Yet in another example, the hardware devices may be executing an outdated version of software associated with recording the values in the column corresponding to the key. The data validation layer 108 can identify the incorrect data type, the rule-based configuration module 104 can cluster the columns across these different hardware devices (that may be distributed across a large geographic area—e.g., several continents), and the machine learning instruction set can cause the data validation layer 108 to identify the hardware devices and portion of the software running on the hardware devices that are generating the incorrect data types.

The data validation layer 108 compares the parsed data to a range of values that the parsed data can be within. For instance, returning to the example above, the data validation layer 108 can determine that the values in the column fall outside the range of values that they should be within. There may be multiple values in the column that do not fall within the range that they should fall within, and the data validation layer 108 can execute the instructions in rule-based configuration module 104 to group the columns across files containing values that fall outside the range. The data validation layer 108 can execute the machine learning instruction set to identify the hardware devices and portion of the software running on the hardware devices that are generating the values that do not fall within the designated range.

In an embodiment, basic validation module 108a includes instructions that remove any empty columns from the key value pair table. For example, if an entire column corresponding to the key is empty, basic validation module 108a removes the column from the key value table. In this example, the data validation layer 108 groups all of the empty columns across all the imported files in response to executing the instructions in rule-based configuration 104, stores the empty columns in memory, and as explained above executes the machine learning instruction set to identify the hardware devices and the portion of the software running on the hardware devices that are generating the empty columns.

Rule-based validation module 108b may check specific rules for any particular column or key value pair. For example, rule-based validation module 108b may include instructions that cause the rule-based configuration module 108b to evaluate the values of one or more columns. For instance, there may be a column index tag that corresponds to a set of indices that may be validated by the rule-based validation module 108b. As an example, the column index tag may include the indices corresponding to columns 2, 4, and 5. The $2^{nd}$ column may correspond to a product name, the $4^{th}$ column may correspond to a category, and the $5^{th}$ column may correspond to a product brand. The rule-based validation module 108b may check the entries in the $2^{nd}$ column to determine whether the entries correspond to an appropriate product name. The rule-based validation module 108b may check the entries in the $4^{th}$ column to determine whether the entries correspond to an appropriate category. The rule-based validation module 108b may check the entries in the $5^{th}$ column to determine whether the entries correspond to an appropriate product brand. In some embodiments, there may be a column name tag that the rule-based validation module 108b may check for a certain key value pair in data. For example, if the data is XML or JSON data, the rule-based validation module 108b may check key value pairs in the data to ensure that the key value entries in a column correspond to entries that should be in the column. For example, the tag may be a column name tag and there may be an age key and an education key corresponds to the column name tag. The rule-based validation module 108b may determine whether the value for each entry in the data with the column name tag corresponds to the age key, education, or both the age key and education key.

In one embodiment, data processing layer 110 is an instruction set that includes schema loader module 110a and transformation module 110b. Schema loader module 110a includes instructions that load a schema for the transformation of the validated data and transformation module 110b transforms the validated data. The schema loader module 110a may include a schema for mapping the validated table data to a format that is readable by one or more hardware devices in the distributed data store 116. In some embodiments, the validated table data may be mapped to a JavaScript Object Notation (JSON) format. In some embodiments the mapping can be a mapping from a validated CSV file format to a JSON format.

The data processing layer 110 loads the schema from the global shared library 114. The global shared library 114 includes one or more dynamic linked libraries containing the schema loaded by the schema loader 110a, and the instructions in the schema loader 110a cause the one or more processors to load the dynamic linked library containing the schema.

In an embodiment, data pump module 112 includes instructions that when executed exports the transformed data to the distributed data store 116.

The rule-based configuration module 104 includes instructions that cluster invalid columns corresponding to a particular key as explained above. The rule-based configuration module 104 may cluster valid columns corresponding to a particular key as explained above. The rule-based configuration module 104 may also cluster empty columns corresponding to a particular key as explained above.

Figure 2:
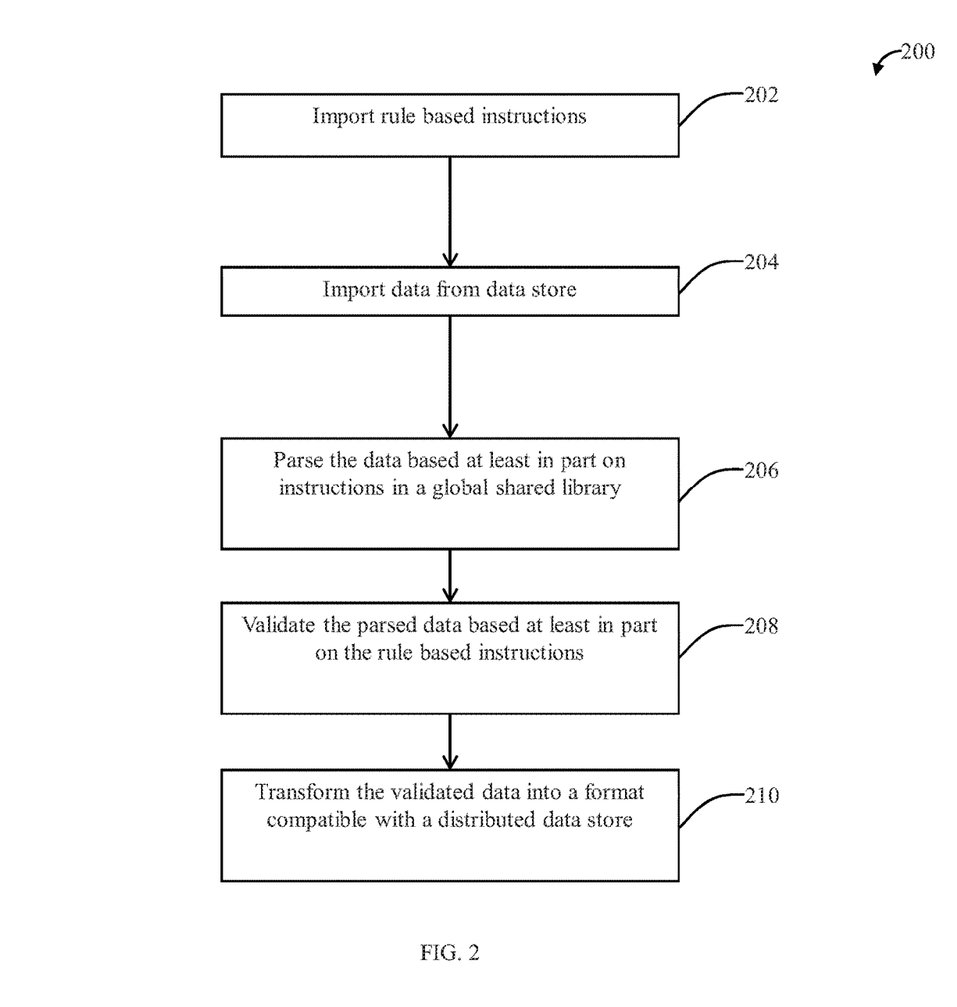
FIG. 2 is a flow diagram for identifying the cause of errors in data stored in a distributed data store, according to an exemplary embodiment.

FIG. 2 is an exemplary flow diagram for identifying the cause of errors in data stored in a data store, according to an embodiment. The method begins with a computing device that imports rule-based instructions (step 202). For example, the computing device can include one or more processors, and can import rule-based instructions from a library (i.e., global shared library 114). The rule-based instructions can be stored in a memory as rule-based configuration module 104. The rule-based instructions can include instructions for grouping, or clustering, different data together based on errors that might be found in the data. The rule-based instructions can also include instructions that apply one or more machine learning techniques to identify a source of the error (e.g., a hardware device in the distributed data store and/or the software executing on the hardware device in the distributed data store). After the rule-based instructions are imported, the computing device can import data from a data store (i.e., distributed data store 116) (step 204). After the computing device imports the data, the computing device can parse the data based at least in part on instructions in a global shared library (step 206). The data may be a structured file, such as a CSV file, or may be an unstructured file such as a key value pair file. The computing device can parse the data such as, but not limited to the exemplary method depicted in FIG. 3.

Figure 3:
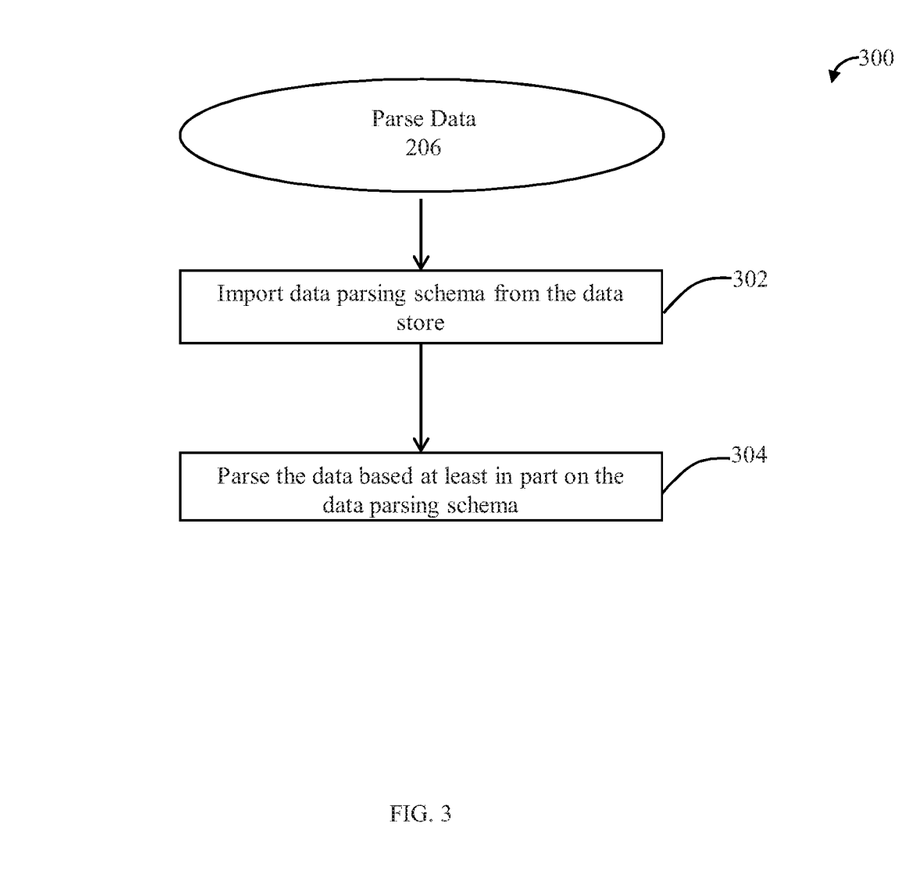
FIG. 3 is a flow diagram for parsing data in the data store into a schema for processing by the data processing framework, according to an exemplary embodiment.

The data parsing layer 106 can import a data parsing schema from the distributed data store in step 302. For example, the data parsing layer 106 can import a schema and parse a file with a CSV format into a file with a key value table format. In some embodiments, the instructions in the data parsing layer 106 can parse the data in the CSV file into a table including columns corresponding to the keys and rows corresponding to the values (records). For example, the imported data may include reviews of a product made by different manufactures (e.g., cameras made by different manufacturers). The reviews of the different makes of the product may be posted to a website or social media platform and logged in different hardware devices in a distributed data store. For instance one or more hardware devices, such as storage devices, in the distributed data store may store the data associated with the different reviews. That is the reviews may be spread across different storage devices based on geographical location. For example, reviews for the product in a first location of a country may be stored in a storage device located in the first location of the country, and reviews for the product in a second location of the same country may be stored in a storage device located in the second location of the country. This could equally apply to reviews across countries and different continents.

The data may include any number of different types of information associated with the review of the different makes of the product. For example, the data can include a date associated with when the review of the make of the product was posted to a website or social media platform.

Accordingly, the date may have a format of month, day, and year with the month and the day being separated by a first dash, first slash, or first period, and the day and the year being separated by a second dash, second slash or second period. In this case, the month, day, and year may be expressed as integer values. In some embodiments, the date may also be expressed in a day, month, and year format as well where the day, month, and year are also expressed as integer values. In this embodiment, the day, month, and year may be separated in the same way that the month, day, and year are separated as explained above.

In some embodiments, the date can also be expressed as month, day, and year in which the month is expressed as a string, and the day and year are expressed as integers. In some embodiments a timestamp might also be associated with time at which the review is posted the website or social media platform. The timestamp can be expressed as hours, minutes, seconds, and microseconds. The hours, minutes, seconds, and microseconds can be expressed as integers, and they can be separated by colons. That is the hours, can be separated from the minutes by a first colon, the minutes can be separated from seconds by a second colon, and the seconds can be separated from the microseconds by a third colon.

The hours can be expressed as two integers that are horizontally adjacent to one another, where the left integer can be any number between 0 and 2 and the right number can be any number between 0 and 9 for storage devices that maintain a twenty-four hour clock. That is the hours in a timestamp generated by a twenty-four hour clock can be between 00-23. In some embodiments storage devices can maintain a twelve hour clock in which case the left integer can be either 1 or 2, and the right integer can be any number between 0 and 9. Accordingly the hours can be expressed in a timestamp generated by a twelve hour clock can be between 12-12.

The minutes can be expressed as two integers that are horizontally adjacent to one another, where the left integer can be any number between 0 and 5 and the right integer can be any number between 0 and 9. Accordingly the minutes can be expressed in a timestamp generated by a twenty-four hour clock or twelve hour clock as 00-59. The seconds can be expressed as two integers that are horizontally adjacent to one another, where the left integer can be any number between 0 and 5 and the right integer can be any number between 0 and 9. Accordingly the seconds can be expressed in a timestamp generated by a twenty-four hour clock or twelve hour clock as 00-59. The microseconds can be expressed as two integers that are horizontally adjacent to one another, where the left integer can be any number between 0 and 5 and the right integer can be any number between 0 and 9. Accordingly the microseconds can be expressed in a timestamp generated by a twenty-four hour clock or twelve hour clock as 00-59.

The data can also include a product name which can be expressed as a combination of one or more strings, characters, or integers. The product name can be expressed in a number of different ways. For instance the product name recorded in the data may include additional strings, characters, or integers that are not associated with the official product name corresponding to the product. For example, the official product name may include one or more first strings, one or more first integers, and one or more first characters, but the product name recorded in the data may include the one or more first strings, one or more first integers, the one or more first characters as well as other descriptive material about the product added to the data. For instance, the descriptive material can include certain functional aspects about the product, the color of the product, accessories that can be used with the product, and dimensions of the product.

The data can also include a model number of the product which can be expressed as a combination of one or more strings, characters, or integers. The data can also include a category that the product belongs to which can be expressed as a one or more strings. For example, if the product is a camera, the string "camera" is recorded in the data. The data can also include the name of a brand or manufacturer of the product. The name of the brand or manufacturer of the product can be expressed as a string. The data can also include a title of the review of the product, and can be expressed as a combination of one or more characters, strings, integers, or floating point values. The data can also include a rating of the product which can be expressed as an integer on a scale. For example, the scale can be between 1 and 5, where a 1 corresponds to a lowest score and a 5 corresponds to the highest score, or vice versa. The data can also include an answer to a question about whether a product is recommended by a reviewer. In some embodiments the answer to the question may be expressed as a string corresponding to a "yes" or "no". In other embodiments the answer may be expressed as an integer value, where a 1 corresponds to "yes" and 0 corresponds to "no". The data can also include commentary about the product, which can be expressed as one or more strings. The commentary can include a reviewer's comments about the product, and can be expressed as multiple strings, characters, integers, floating point values, or special characters.

Each of the date, timestamp, product name, model number, category, brand or manufacture of the product, title of the review, rating of the product, recommendation of the product, and commentary about the product can be included in a file, such a structured file, and can be separated by a delimiter such as a comma (e.g., CSV file). Each of the date, timestamp, product name, model number, category, brand or manufacture of the product, title of the review, rating of the product, recommendation of the product, and commentary about the product corresponds to a data field and each review associated with each of the data fields has a corresponding value associated with each of the data fields.

At step 304 the computing device can parse the data based at least in part on the data parsing schema. That is the data parsing layer 106 can execute the instructions for the schema parser module 106b to parse the data into the schema, based on the schema loaded by the schema loader module 106a. The data parsing schema can be mapping the data in a structured file, such as a CSV file, to an unstructured file, such as a key value pair table. The data parsing layer 106 can map each of the data fields in the structured file to a corresponding key. The data parsing layer 106 can map each of the values corresponding to each of the data fields to a corresponding value associated with the corresponding key. As mentioned above, each of the keys can correspond to a column and each review associated with the data values corresponding to the key may correspond to a row. Each of the rows corresponds to a record, and each record includes multiple values each of which correspond to a key.

Returning to FIG. 2 the computing device validates the parsed data based at least in part on the rule-based instructions in step 208. The computing device can validate the parsed data such as, but not limited to the exemplary method depicted in FIG. 4. At step 402 data validation layer 108 can identify one or more invalid columns in the schema. Data validation layer 108 can cluster the one or more invalid columns identified across all of the files stored in different storage devices in the distributed data store, and can store the invalid columns in a memory for further processing to determine a source of an error in the imported data. Data validation layer 108 can identify the one or more invalid columns based at least in part on an error in a value recorded in the entire one or more columns. For example, data validation layer 108 can identify that the value recorded in a date column contains an error based at least in part on the number associated with the months exceeding 12 or being less than 01. Data validation layer 108 can identify that the value recorded in the date column contains an error based at least in part on the number associated with the days exceeding 31 or being less than 01. Data validation layer 108 can identify that the value recorded in the year column contains an error based at least in part on the number associated with the year exceeding the current year or predating the existence of the product being reviewed. Data validation layer 108 can also identify that the value recorded in the date column contains an error based at least in part on a string in that should correspond to a month not corresponding to a month. For instance, data validation layer 108 may identify that the value recorded in the date column contains an error when a string corresponding to something other than a month is recorded in place of the spelling of the month. Additionally data validation layer 108 can determine that the date column contains and error based at least in part on the column containing data that does not conform to a format for the date column.

Figure 4:
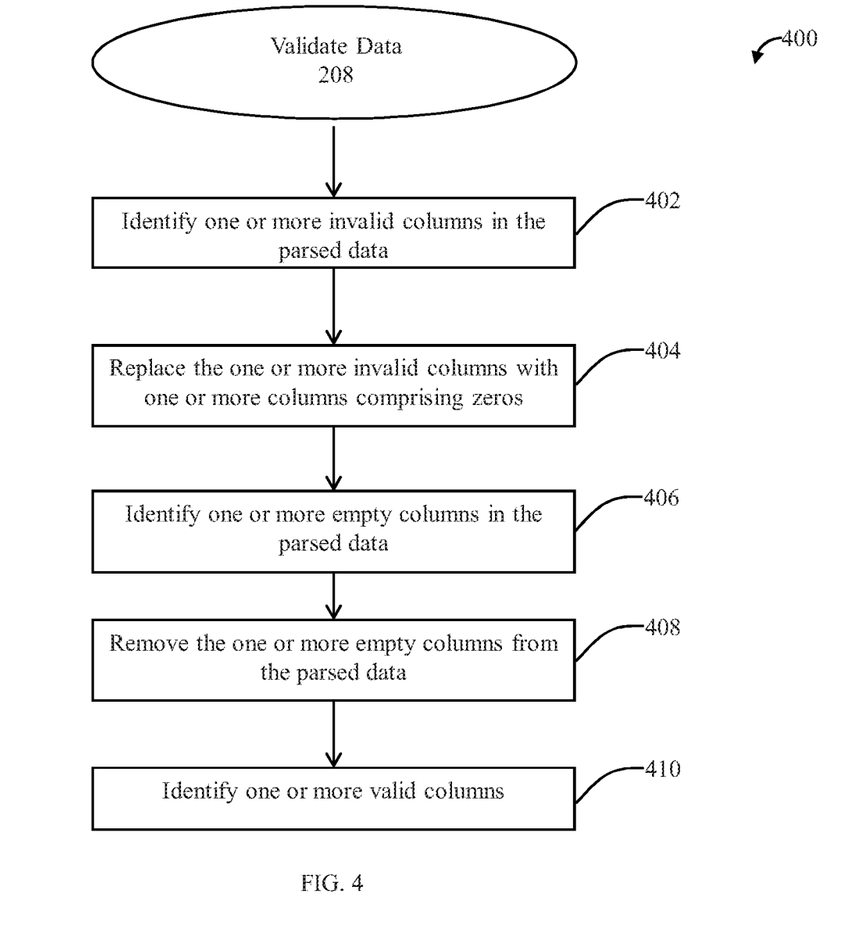
FIG. 4 is a flow diagram for identifying valid, empty, and invalid data in the schema, according to an exemplary embodiment.

Data validation layer 108 can identify that the value recorded in the timestamp column contains an error based at least in part on the number associated with the hours exceeding 12 in a storage device maintaining a twelve hour clock, or the number associated with the hours exceeding 24 in a storage device maintaining a twenty-four hour clock. Data validation layer 108 can also identify that the value recorded in the timestamp column contains an error based at least in part on the number associated with the minutes exceeding 59 or being below 00. Similarly data validation layer 108 can also identify that the value recorded in the timestamp column contains an error based at least on the number associated with the seconds or microseconds exceeding 59 or being below 00. Data validation layer 108 can also identify that the timestamp column contains an error based at least in part on the recorded in the column containing characters, strings, or floating point values. Yet still in another example, data validation layer 108 can identify that the date and/or timestamp column contains an error based at least in part on the values in the date and/or timestamp column only including special characters.

Data validation layer 108 can identify that a product name column containing a product name of a product contains an error based at least in part on the value recorded in the product name column not matching a product name associated with the product. For example, data validation layer 108 can identify that the product name column contains and an error based at least in part on the value recorded in the product name column corresponding to a different product (e.g., a car instead of a camera). In another example, data validation layer 108 can identify that the product name column contains an error based at least in part on the value recorded when the product name column only includes floating point values, integer values, and no strings or character values. Yet still in another example, data validation layer 108 can identify that the product name column contains an error based at least in part on the value recorded in the product name column only including special characters.

Data validation layer 108 can identify that a model number column containing a model number of a product contains an error based at least in part on the value recorded in the model number column not matching a model number associated with the product. For example, data validation layer 108 can identify that the model number column contains and an error based at least in part on the value recorded in the model number column corresponding to a different product (e.g., a model number associated with a car instead of a camera). In another example, data validation layer 108 can identify that the model number column contains an error based at least in part on the value recorded in the model number column only including special characters.

Data validation layer 108 can identify that a category column containing a category to which the product belongs contains and error based at least in part on the value recorded in the category column not matching the category associated with the product. For example, if the product is a camera, the string "camera" should be recorded in the category column. If the value recorded in the category column does not match the category of the product, data validation layer 108 identifies that the category column contains an error based at least in part on the value recorded in the category column corresponding to a different product (e.g., a string for "car" instead of a string for "camera"). In another example, data validation layer 108 can identify that the category column contains an error based at least in part on the value recorded in the category column only including special characters.

Data validation layer 108 can identify that a name of the brand or manufacturer column containing a model number of a product contains an error based at least in part on the value recorded in the brand or manufacturer column not matching a brand or manufacturer associated with the product. For example, data validation layer 108 can identify that the brand or manufacturer column contains and an error based at least in part on the value recorded in the brand or manufacturer column corresponding to a different product (e.g., a brand or manufacture associated with a company that makes cars exclusively instead of a company that makes camera or cars and cameras). In another example, data validation layer 108 can identify that the brand or manufacturer column contains an error based at least in part on the value recorded in the brand or manufacturer column only including special characters.

Data validation layer 108 can identify that a rating of the product column containing a rating of a product contains an error based at least in part on the value recorded in the rating of the product column exceeding a maximum value of a designated rating scale or being below a minimum value of the designated rating scale. For example, the maximum value of the designated rating scale may be a value 5. Accordingly data validation layer 108 may identify that the rating of the product column contains an error because the value recorded in the rating of the product column exceeds the maximum value that can be recorded for the rating of the product column. Data validation layer 108 may also identify that the rating of the product column contains an error because the value recorded in the rating of the product column is below the minimum value that that can be recorded for the rating of the product column. Data validation layer 108 can also identify that an error is recorded in the rating of the product column based at least in part on the values recorded in the rating of the product column containing floating point values, strings, or characters. In another example, data validation layer 108 can identify that the brand or manufacturer column contains an error based at least in part on the value recorded in the brand or manufacturer column only including special characters.

Data validation layer 108 can identify that a recommendation for the product column contains an error based at least in part on the value recorded in the recommendation for the product of the column being not being equal to a "yes" or a "no" or a 1 corresponding to a yes or a 0 corresponding to a no. In some embodiments the value in the recommendation for the product column can be a binary value other than yes/no or 1/0. Accordingly data validation layer 108 can identify that a recommendation for the product column contains an error based at least in part on the value recorded in the recommendation for the product column not being a binary value. Data validation layer 108 can identify that the recommendation for the product column contains an error based at least in part on the value recorded in the recommendation for the product column only including special characters.

At step 404 data validation layer 108 can replace the one or more invalid columns with one or more columns including zeros. At step 406 data validation layer 108 can identify one or more empty columns in the parsed data, and remove the one or more empty columns from the parsed data in step 408. After the one or more columns are removed from the parsed data, data validation layer 108 can identify one or more valid columns in the parsed data (step 410).

Returning to FIG. 2, transformation module 110 can transform the validated data into a format compatible with the distributed data store (step 210). Transformation module 110 can transform the validated data in accordance with, but not limited to, the exemplary method depicted in FIG. 5. At step 502 transformation module 110 can transform the one or more valid columns into a format associated with the distributed data store. At step 504 transformation module 110 can identify a location of the error in the distributed data store based at least in part on the empty columns and the invalid columns identified in step 402. The data in the invalid columns may be used to determine a device or processor that generates the invalid data. For instance, once all the data has been grouped into their respective error clusters, the data from those individual clusters can be used to identify the root cause. For example, a vehicle may include one or more sensors generating data including the temperature of the vehicle, a timestamp when sensor measurements are being taken, and the latitude and longitude of the vehicle. The data processing layer 110 may check valid floating point values for the latitude measurements in a latitude column and generate a decision tree based on the measurements being outside a certain threshold. In some embodiments, there may be a machine learning algorithm that creates decision trees corresponding to the temperature measurements exceeding a certain temperature. For example, the temperature measurements may exceed 60 degrees Fahrenheit, and the latitude measurements may include invalid floating point values. The decision tree may be generated based on trends among one or more of the sensor measurements resulting in the data processing layer 110 determining that the one or more sensors are the cause of the invalid values.

Figure 5:
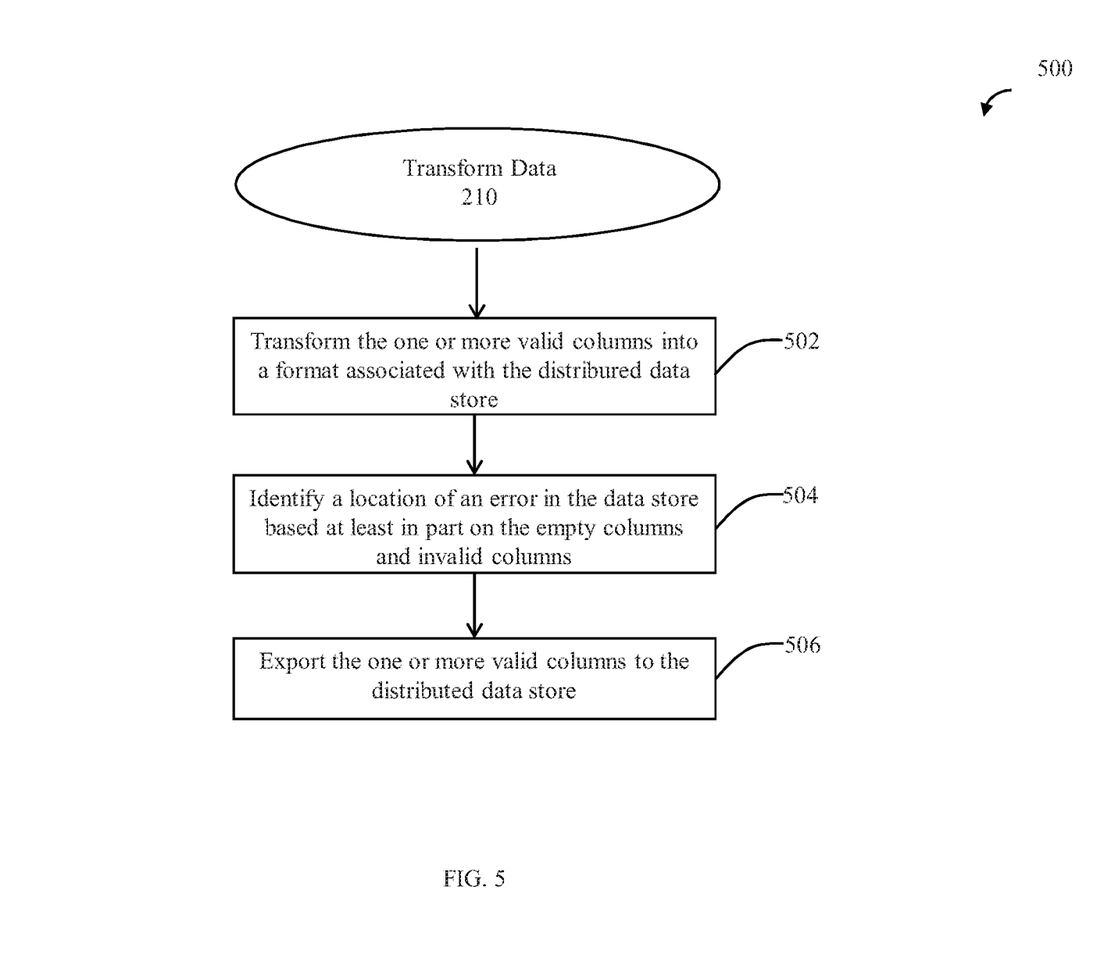
FIG. 5 is a flow diagram for transforming the valid schema into a format compatible with the distributed data store in an exemplary embodiment.

At step 506 transformation module 110 can export the one or more valid columns to the distributed data store.

Figure 6:
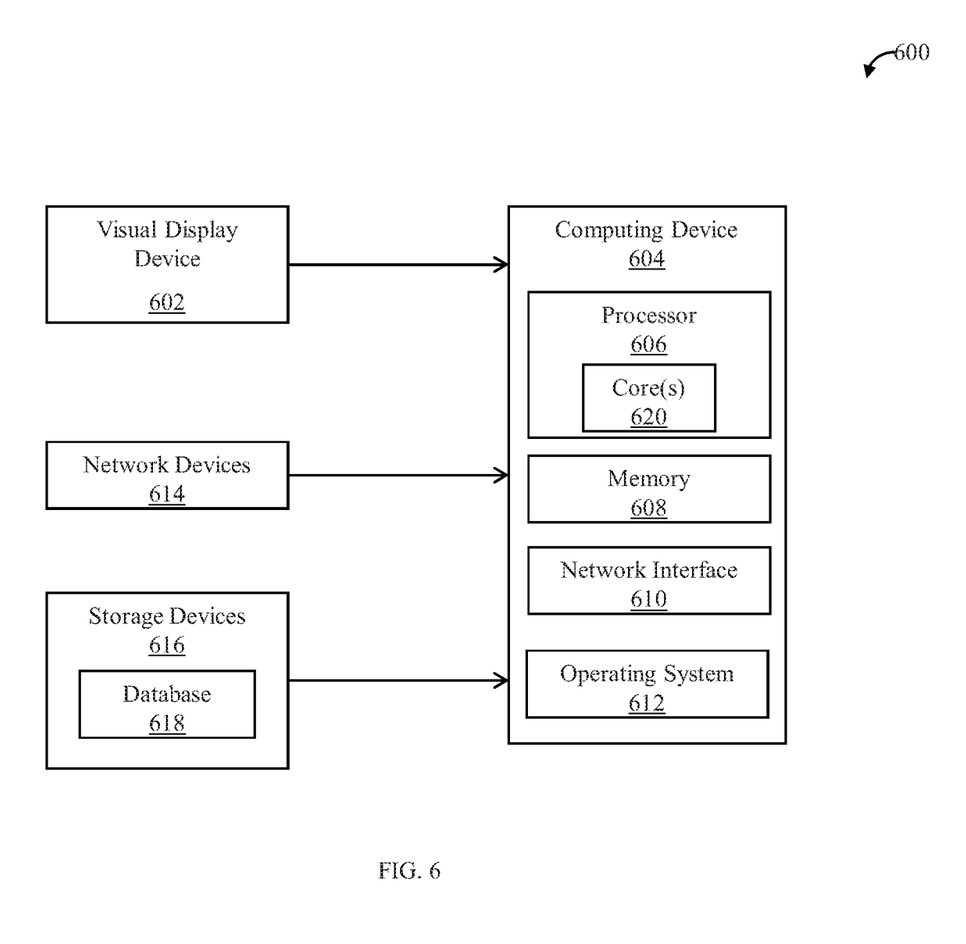
FIG. 6 is a block diagram of a computing device that may be used to implement the exemplary embodiments disclosed herein.

FIG. 6 is a block diagram of an exemplary computing device 600 that can be used to perform one or more steps of the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 608 included in the computing device 600 can store computer-readable and computer-executable instructions or software for implementing exemplary embodiments. The computing device 600 also includes processor 606 and associated core(s) 620, and optionally, one or more additional processor(s) (not shown), in the case of computer systems having multiple processors/cores, for executing computer-readable and computer-executable instructions or software stored in the memory 608 and other programs for controlling system hardware. Processor 606 and can be a single core processor or multiple core processor.

Memory 608 can include a computer system memory or random access memory, such as DRAM, SRAM, EDO RAM, and the like. Memory 608 can include other types of memory as well, or combinations thereof. An individual can interact with the computing device 604 through a visual display device 602, such as a touch screen display or computer monitor, which can display one or more user interfaces for displaying data to a user (e.g., a display of a storage device in the distributed store connected to the computing device 604 via network interface 610 and software running on the storage device that is the cause of an error in imported data). The visual display device 602 can also display other aspects, elements and/or information or data associated with exemplary embodiments. The computing device 604 can include other I/O devices for receiving input from an individual, for example, a keyboard or another suitable multi-point touch interface, a pointing device (e.g., a pen, stylus, mouse, or trackpad). The keyboard and the pointing device can be coupled to the visual display device 602. The computing device 604 can include other suitable conventional I/O peripherals.

The computing device 604 can also include one or more storage devices 616, such as a hard-drive, CD-ROM, or other computer readable media, for storing data and computer-readable instructions and/or software, such as one or more modules of the data processing framework 100 shown in FIG. 1 that implements exemplary embodiments of the system as described herein, or portions thereof, which can be executed to generate a graphical user interface on visual display device 602. Exemplary storage devices 616 can also store one or more databases for storing suitable information required to implement exemplary embodiments. The databases can be updated by an individual or automatically at a suitable time to add, delete or update one or more items in the databases. Exemplary storage devices 616 can store one or more databases 618 for storing provisioned data, and other data/information used to implement exemplary embodiments of the systems and methods described herein.

The computing device 604 can include a network interface 610 configured to interface via one or more network devices 614 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 604 can include a built-in network adapter, network interface card, PCMCIA network card, card bus network adapter, wireless network adapter, USB network adapter, modem or another device suitable for interfacing the computing device 604 to a type of network capable of communication and performing the operations described herein. Moreover, the computing device 604 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 604 can run an operating system 612, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 612 can be run in native mode or emulated mode. In an exemplary embodiment, the operating system 612 can be run on one or more cloud machine instances.

The description is presented to enable a person skilled in the art to create and use a computer system configuration and related method and systems for modifying capacity for a new retail facility. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

I claim:

1. A system for performing rule-based data configuration, the system comprising:
    at least one data store configured to hold data; and
    a computing device equipped with a processor and configured to execute a data processing platform that includes:
        a global shared library, the global shared library including a set of data configuration rules, the data configuration rules including rules for parsing, validating and processing data;
        a data parsing layer, the data parsing layer configured to receive the data from the at least one data store and parse the data into a data validation schema based at least in part on one or more rules in the global shared library;
        wherein the data validation schema is a key-value pair schema and the data is parsed into a table, wherein the table includes columns representing keys and rows corresponding to values;
        a data validation layer, the data validation layer configured to perform operations comprising:
            identify one or more invalid data columns in the data validation schema based at least in part on at least one data validation rule in the global shared library,
            wherein the data validation layer uses the at least one data validation rule to identify when a selected column is invalid by checking data types of values in the selected column against a data type associated with a key of the selected column;
            identify one or more empty columns in the data validation schema based at least in part on the at least one validation rule, and
            identify one or more valid columns in the data validation schema based at least in part on the at least one validation rule;
        and
        a data processing layer, the data processing layer configured to:
            convert the one or more valid columns into a data format associated with an ingestion system based at least in part on one data processing rule in the global shared library,
            identify a location of an error in the at least one data store based at least in part on the empty columns and the invalid columns, and output the one or more valid converted columns to the ingestion system;
            wherein the data validation layer selectively clusters the columns across all files that include a selected key into a memory pool for analysis, wherein the analysis is performed by utilizing machine learning instructions to determine defects or errors in the hardware, firmware, and/or software of the at least one data store.

2. The system of claim 1 wherein the at least one data store includes at least one of a data warehouse and a relational database management system (RDBMS).

3. The system of claim 1 wherein the data parsing layer includes:
   a data validation schema loader configured to load the data validation schema from the global shared library, and
   a data validation schema parser configured to parse the data into the data validation schema.

4. The system of claim 1 wherein the data processing layer includes:
   a data ingestion schema loader configured to load a data ingestion schema from the global shared library, and
   a transformation module configured to convert the one or more valid columns into a format of the ingestion system, wherein the format is based at least in part on the data ingestion schema.

5. The system of claim 1 wherein the machine learning instructions cluster errors by type of error.

6. The system of claim 5 wherein the machine learning instructions apply a decision tree technique to the clustered errors to determine a root cause of an error type.

7. A non-transitory medium storing computing device-executable instructions that when executed by at least one processor cause the at least one computing device to:
   input data from at least one data store;
   parse the data into a data validation schema retrieved from a shared library;
   wherein the data validation schema is a key-value pair schema and the data is parsed into a table, wherein the table includes columns representing keys and rows corresponding to values;
   perform data validation operations to:
   remove one or more empty columns from the data validation schema;
   identify one or more invalid columns in the data validation schema based at least in part on at least one data validation rule;
   wherein the data validation operations use the at least one data validation rule to identify when a selected column is invalid by checking data types of values in the selected column against a data type associated with a key of the selected column;
   identify one or more valid columns in the data validation schema based at least in part on the at least one data validation rule;
   convert the one or more valid columns into a data format associated with an ingestion system;
   identify a location of an error in the at least one data store based at least in part on the empty columns and invalid columns; and
   output the one or more converted valid columns to the ingestion system;
   wherein the data validation operations selectively cluster the columns across all files that include a selected key into a memory pool for analysis, wherein the analysis is performed by utilizing machine learning instructions to determine defects or errors in the hardware, firmware, and/or software of the at least one data store.

8. The medium of claim 7 wherein the at least one data validation rule is associated with a structure of the one or more invalid columns and the one or more valid columns.

9. The medium of claim 8, wherein the structure corresponds to an attribute associated with the one or more invalid columns and the one or more valid columns.

10. The medium of claim 8, wherein the structure corresponds to a record or a tuple associated with the one or more invalid columns and the one or more valid columns.

11. The medium of claim 10, wherein the attribute has a data type.

12. The medium of claim 11, wherein a data type of a field of the record corresponds to the data type associated with the attribute.

13. The medium of claim 7, wherein the machine learning instructions further cause the at least one computing device to:
   determine the one or more errors in the data based at least in part on a decision tree applied to the one or more empty columns, one or more valid columns, and the one or more invalid columns.

14. The medium of claim 13, wherein the decision tree comprises one or more conditional elements associated with the attribute of the one or more valid columns and one or more invalid columns.

15. The medium of claim 13, wherein the decision tree comprises one or more conditional elements associated with the record of the one or more valid columns and one or more invalid columns.

16. The medium of claim 7, wherein the machine learning instructions cause the at least one computing device to:
   determine the one or more errors in the data based at least in part on at least one field in the one or more valid columns and at least one field in the one or more invalid columns.

17. The medium of claim 7, wherein the machine learning instructions cause the at least one computing device to:
   determine the one or more errors in the data based at least in part on at least one field in the one or more valid columns and at least one field in the one or more empty columns.

18. A method comprising:
   inputting data from at least one data store;
   parsing the data into a data validation schema retrieved from a shared library;
   wherein the data validation schema is a key-value pair schema and the data is parsed into a table, wherein the table includes columns representing keys and rows corresponding to values;
   perform data validation operations to:
   removing one or more empty columns from the data validation schema;
   identifying one or more invalid columns in the data validation schema based at least in part on at least one data validation rule;
   wherein the data validation operations use the at least one data validation rule to identify when a selected column is invalid by checking data types of values in the selected column against a data type associated with a key of the selected column;
   identifying one or more valid columns in the data validation schema based at least in part on the at least one data validation rule;
   converting the one or more valid columns into a data format associated with an ingestion system;

identifying a location of an error in the at least one data store based at least in part on the empty columns and invalid columns; and outputting the one or more converted valid columns to the ingestion system;

wherein the data validation operations selectively cluster the columns across all files that include a selected key into a memory pool for analysis, wherein the analysis is performed by utilizing machine learning instructions to determine defects or errors in the hardware, firmware, and/or software of the at least one data store.

* * * * *

UNITED STATES PATENT AND TRADEMARK OFFICE
CERTIFICATE OF CORRECTION

PATENT NO. : 11,403,161 B2
APPLICATION NO. : 16/870555
DATED : August 2, 2022
INVENTOR(S) : Divakant Pandey It is certified that error appears in the above-identified patent and that said Letters Patent is hereby corrected as shown below:

On the Title Page

Item [72], delete "Up (IN)" and insert -- UP (IN) --, therefor.

Item [60], Line 2, delete "2018." and insert -- 2019. --, therefor.

Signed and Sealed this
Twentieth Day of December, 2022

Katherine Kelly Vidal
*Director of the United States Patent and Trademark Office*